United States Patent [19]
Essert

[11] Patent Number: 5,216,736
[45] Date of Patent: Jun. 1, 1993

[54] WELDED SPLICE ELEMENT

[75] Inventor: Robert Essert, Glen Ellyn, Ill.

[73] Assignee: Reliance Comm/Tec Corporation, Chicago, Ill.

[21] Appl. No.: 779,393

[22] Filed: Oct. 18, 1991

[51] Int. Cl.$^5$ .............................................. G02B 6/00
[52] U.S. Cl. .................................................... 385/96
[58] Field of Search ............................ 385/96, 97, 99

[56] References Cited

U.S. PATENT DOCUMENTS

| | | | |
|---|---|---|---|
| 4,057,448 | 11/1977 | Miller | 385/99 X |
| 4,109,369 | 8/1978 | Taylor | 385/99 X |
| 4,773,728 | 9/1988 | Kershaw | 385/89 |
| 4,846,545 | 7/1989 | Estabrook et al. | 385/99 |
| 4,974,925 | 12/1990 | Troutman et al. | 385/99 |
| 5,009,474 | 4/1991 | Wurmser et al. | 385/99 |
| 5,024,505 | 6/1991 | Junji et al. | 385/97 |

*Primary Examiner*—Akm E. Ullah
*Attorney, Agent, or Firm*—Trexler, Bushnell, Giangiorgi & Blackstone, Ltd.

[57] ABSTRACT

An optical fiber splice element useful for effecting a splice connection between at least two optical fibers comprises a pair of joinable splice halves. Fiber channels are provided on the splice halves extending through the element for accepting an optical fiber. Recess portions are provided on the splice halves to one side of the fiber channel for accepting a tool for applying a force for variably separating the halves to allow for fiber insertion in the fiber channel. Welds for joining the halves are disposed to a side of the fiber channel opposite to the recess portion. The welds are capable of holding the halves together along a side adjacent thereto while allowing the halves to variably separate along a side adjacent the recess portion so that the halves are at an angle to each other when separated by application of a force to the recess portion, with the welds being generally adjacent an apex of an angle so formed by the halves. The welds are capable of encouraging the halves back together when the application of force has ceased.

24 Claims, 2 Drawing Sheets

WELDED SPLICE ELEMENT

BACKGROUND OF THE INVENTION

The present invention relates generally to a novel and improved construction of an optical fiber splicer having a welded splice element, and more specifically to a unique welded splice element useful for splicing at least two optical fibers together.

Many different types and constructions of optical fiber splicers and splice elements for use in the same are evident in the prior art. The splicers often house the splice elements, and have channels to guide optical fibers towards the splice elements to form a spliced connection therebetween. These splicers and splice elements have become quite popular in the telecommunications industry, for example, due to the increased transmission speeds and signal clarity of optical fibers used as telecommunications transmission lines as compared with older, metallic wire telecommunications transmission lines.

The spliced connection between two optical fibers is very critical to the operation of a telecommunications network because optical fibers utilize the phenomenon of total internal reflection of incident electromagnetic wave fronts. If signal bearing cores of the spliced fibers are misaligned even slightly, the quality of the telecommunication network may be compromised because signal loss can occur at the spliced interface between two optical fibers. This can result in customer dissatisfaction with the telecommunications network service and operator, and in reduced revenues to the network operator.

To reduce the probability of core misalignment and signal loss, the splice elements are constructed to meet relatively exacting standards. One such splice element is disclosed in the U.S. patent application of Essert et al., Ser. No. 07/579,127 now U.S. Pat. No. 5,121,456 (the '127 application). That patent application is assigned to the assignee of the present invention, and the disclosure thereof is incorporated herein by this reference.

With use of the prior art splice elements, two elements are sandwiched together within the splicer, with the optical fibers to be spliced located therebetween. To provide a spliced connection meeting the exacting standards, the splice elements are held together by the spring-like properties realized by the novel design of another part of the splicer, such as a housing containing the splice elements. Thus, the construction of the housing and the spring-like properties thereof are relied upon to achieve a proper spliced connection between two optical fibers in the above-referenced '127 application.

As fiber optic technology becomes more and more prevalent in modern applications, it is desired to increase the number and types of applications for reusable splice connectors in various forms of fiber optic equipment. This can result in increased revenues to the operator, and improved service quality.

The welded splice element of the present invention is an improvement over the splice element of the prior art and of the above-disclosed patent application of Essert, and is intended to allow for a plurality of additional applications or uses of reliable and easily operable reusable splice connectors in various optical fiber equipment. Also, with use of the welded splice elements of the invention, the construction of the splicer or housing and the spring-like properties thereof are not relied upon for a proper optical fiber spliced connection, and hence the splicer may be used in a variety of new and different applications.

OBJECTS AND SUMMARY OF THE INVENTION

A general object of the present invention is to provide a new and improved construction for optical fiber splicers.

A more specific object of the invention is to provide a welded splice element for use in splicing at least two optical fibers together.

Another object of the present invention is to provide an optical fiber splice element assembled in part by a welding process.

An additional object of the invention is to provide an optical fiber splicer wherein the spring-like forces necessary to provide a proper spliced connection between optical fibers is provided by the splice element itself, and not by other parts of the splicer such as a housing.

A further object of the present invention is to provide an improved splice element for optical fibers which utilizes pre-existing parts in a unique way.

Another object of the invention is to provide an optical fiber splice element wherein the material comprising the splice element provides in part the necessary properties to accept and to splice, or to release optical fibers.

An additional object of the present invention is to provide an optical fiber splice element wherein the movement thereof necessary to accept or release optical fibers is small enough such that no permanent deformation of the element will result.

A related object of one embodiment of the invention is to provide an array for use with an optical fiber splicer which can hold a plurality of splice elements and optical fibers thereby facilitating arrangement and fanning thereof from a multiple fiber cable.

An optical fiber splice element useful for effecting a spliced connection between at least two optical fibers comprises a pair of joinable splice halves. The splice halves define a fiber channel when aligned and joined for accepting an optical fiber, which channel extends through the element. The splice halves also define a recess portion to one side of the fiber channel for accepting a tool for applying a force for variably separating the halves to allow for fiber insertion in the fiber channel. Welds for joining the halves are disposed to a side of the fiber channel opposite to the recess portion. The welds are capable of holding the halves together along a side adjacent thereto while allowing the halves to variably separate along a side adjacent the recess portion so that the halves are at an angle to each other when separated by application of a force to the recess portion, with the welds being generally adjacent an apex of an angle so formed by the halves, and the welds are also capable of encouraging the halves back together when the application of the force has ceased.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 1:
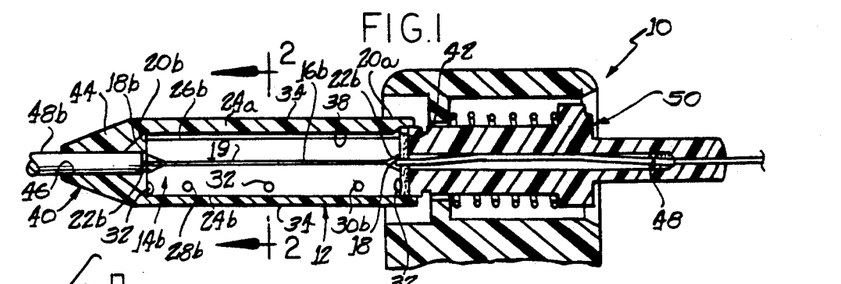
FIG. 1 a sectioned plan view of an optical fiber splicer having a welded splice element constructed according to the teachings of the present invention.

Referring initially to FIG. 1, an optical fiber splicer 10 having a welded splice element 12, constructed according to the teachings of the present invention, is shown. It is to be noted throughout this description that the utility of the element 12 is not limited to employment with any particular type or construction of splicer. Notably, the unique construction of the element 12 allows it to be used with many different splicers.

The splice element 12 comprises two mirror-image splice halves 14a and 14b which facilitate non-handed construction of the element 12. The splice halves 14a and 14b are preferably composed of a metallic substance, such as aluminum and the like, having sufficient resiliency and memory properties, as will be discussed hereinafter. Preferably, the halves 14a and 14b are substantially identical, and are of a selected aluminum alloy, and are configured substantially similarly to the corresponding structures, as disclosed in the above-referenced United States patent application of Essert et al. Accordingly, reference should be had to that patent application to gain a greater in depth understanding of the construction and function of the splice halves 14a and 14b. It is also to be understood that because the preferred embodiments of the splice halves 14a and 14b are identical to each other, these half structures form corresponding whole splice structures when the splice halves 14a and 14b are joined.

Figure 2:
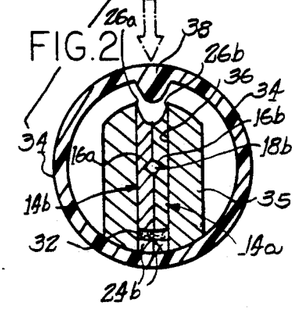
FIG. 2 is a sectioned view, taken in the plane of line 2—2 of FIG. 1, showing novel means for separating the same for insertion of an optical fiber.

As shown in FIGS. 1 and 2, the splice halves 14a and 14b each have substantially centrally located fiber channel halves 16a and 16b, respectively, for accepting optical fibers 18, 18b. The channel halves 16a and 16b extend longitudinally along the splice halves 14a and 14b from one latitudinal edge 20a and 20b thereof to another. In this way, optical fibers 18 can be inserted into the channel halves 16a and 16b from opposite latitudinal edges 20a and 20b of the splice halves 14a and 14b so that a spliced connection therebetween can be affected at a location on the splice element 12, preferably approximately at the midpoint of the fiber channels 16a and 16b.

To facilitate entry of the optical fibers 18, 18b and to guide the same towards each other to form the spliced connection therebetween at interface 19, each of the channel halves 16a and 16b terminate in substantially half-funnel shaped portions 22a and 22b, respectively, on opposite latitudinal edges 20a and 20b of the splice halves 14a and 14b. The gradually reducing diameter construction of the half-funnel portions 22a and 22b serves to direct the optical fibers 18 into the fiber channels 16a and 16b.

As stated above, the fiber channel halves 16a and 16b extend longitudinally and substantially centrally along the splice halves 14a and 14b from one latitudinal edge 20a and 20b to another. This allows for the disposition of other elements or structures to either side of the fiber channel halves 16a and 16b along the longitudinal edges 24a and 24b of the splice halves 14a and 14b.

Specifically, recess portions 26a and 26b are located on the splice halves 14a and 14b along one longitudinal edge 24a and 24b thereof while alignment pins 28a and 28b and complementary alignment holes 30a and 30b are disposed adjacent the opposite longitudinal edge 24a and 24b. The recess portions 26a and 26b on one side and the pins 28a and 28b and the holes 30a and 30b on the other side flank the fiber channel halves 16a and 16b, respectively.

The recess portions 26a and 26b extend away from a longitudinal edge 24a and 24b of the splice halves 14a and 14b inwardly towards the fiber channel halves 16a and 16b. The recess portions 26a and 26b incline from the longitudinal edge 24a and 24b towards the fiber channel halves 16a and 16b. However, the recess portions 26a and 26b extend inwardly a certain distance from the longitudinal edges 24a and 24b. The degree of the slope of these recess portions 26a and 26b, and their inward extension are determined by the dimensions of element separating means, such as a tool or boss, as will be discussed hereinafter. It will be seen that the dimensions of the recess portions 26a and 26b are sufficient to allow entry of means for applying a force for separating the splice halves 14a and 14b to allow for insertion of the optical fibers 18.

The pins 28a and 28b and the holes 30a and 30b are intended to align and join the splice halves 14a and 14b. Specifically, the pins 28a and 28b extend substantially perpendicularly away from a surface of the splice halves 14a and 14b a certain predetermined distance. The holes 30a and 30b recess into the surface of the splice halves 14a and 14b at least the same certain predetermined distance. The configuration of the pins 28a and 28b complements the configuration of the holes 30a and 30b.

Also, the pins 28a and 28b and the holes 30a and 30b are located on the splice halves 14a and 14b adjacent the longitudinal edges 24a and 24b opposite to the recess portions 26a and 26b and equidistantly from latitudinal midlines of the splice halves 14a and 14b. In this manner, the pin of one splice half is insertable into the hole of another splice half when the two are joined to form the element 12. The insertion of the pins 28a and 28b into the holes 30a and 30b results in a frictioned interference fit between the splice halves 14a and 14b which holds the halves 14a and 14b together during subsequent assembly, as will be discussed hereinbelow.

To construct the element 12 from the splice halves 14a and 14b, two splice halves 14a and 14b are selected. Because the splice halves 14a and 14b are identical to each other, it does not matter which splice halves 14a and 14b are selected. This is, by definition, non-handed assembly.

The splice halves 14a and 14b are oriented so that the fiber channel halves 16a and 16b and the edges 20a, 20b, 24a, and 24b oppose each other. When the splice halves 14a and 14b are so oriented, the pin 28a and 28b on one splice half 14a and 14b is in alignment with the hole 30a and 30b on the other splice half 14a and 14b.

Figure 3:
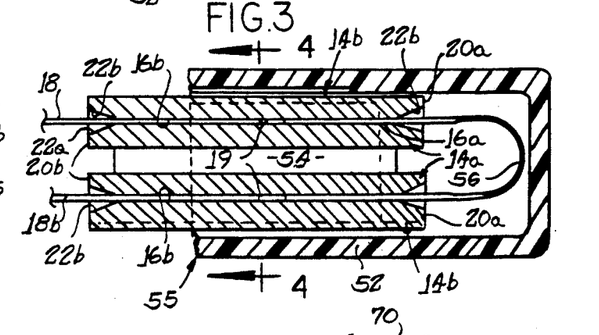
FIG. 3 is a partially sectioned side elevational view of a U-shaped optical fiber splicer utilizing two welded splice elements of the present invention.

The splice halves 14a and 14b are then placed together. When this is done, the pins 28a and 28b are inserted into the holes 30a and 30b, and the fiber channels 16a and 16b, the funnel portions 22a and 22b, and the recess portions 26a and 26b are combined to form whole, not half, structures, as illustrated in FIG. 3. The frictioned interference between the pins 28a and 28b and the holes 30a and 30b, as stated above, retain the splice halves 14a and 14b together during subsequent assembly of the element 12.

To complete the element 12, a novel feature is added to the body portions 14a and 14b. Specifically, welds 32 are provided adjacent the longitudinal edges 24a and 24b opposite the recess portions 26a and 26b for firmly joining the splice halves 14a and 14b together. These welds 32 might be formed by other welding processes, but it is preferable to produce the welds 32 with a carbon dioxide laser.

Figure 5:
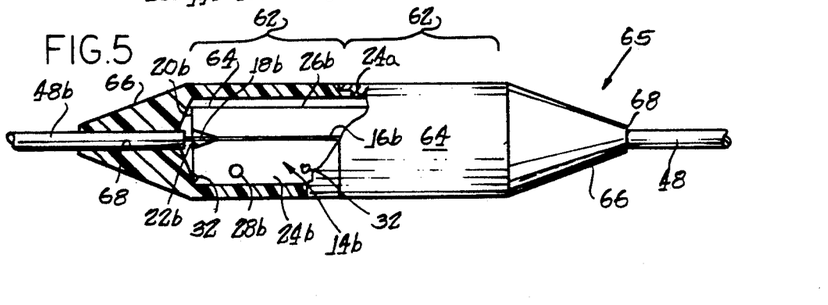
FIG. 5 is a partially sectioned plan view of another optical fiber splicer for use with welded splice elements of the invention.
Figures 7, 8, 9:
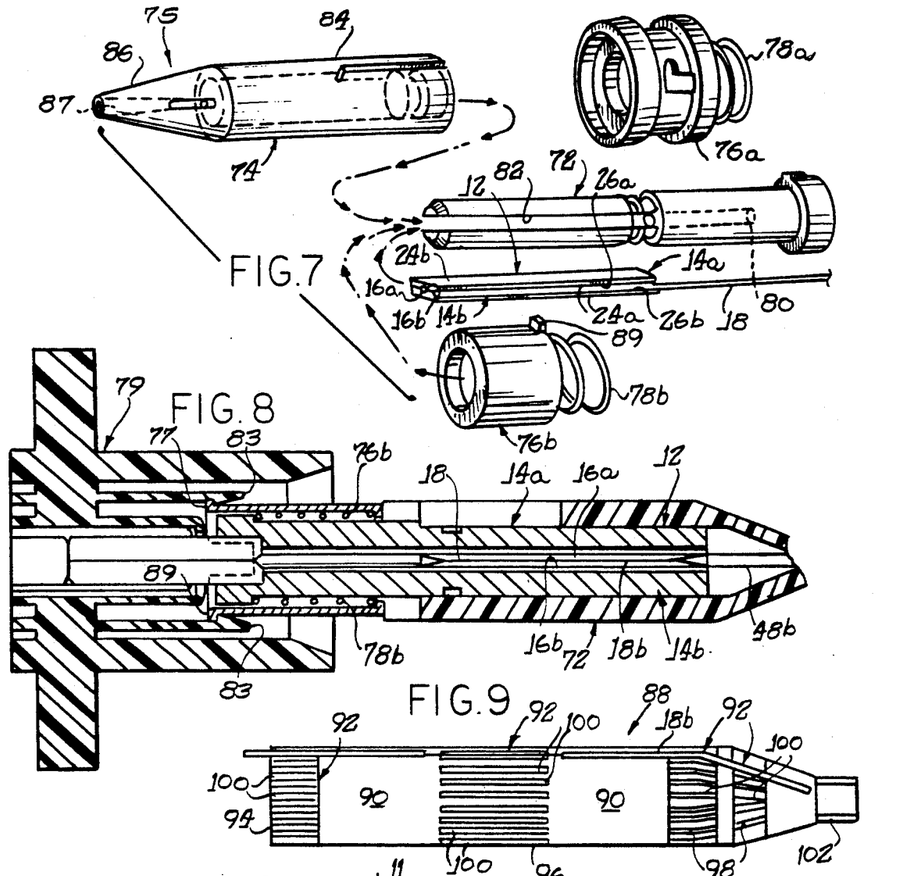
FIG. 7 is an exploded perspective view of another optical fiber splicer similar to the form shown in FIG. 1, using the welded splice element of the present invention.
FIG. 8 is a sectioned plan view of the optical fiber splicer of FIG. 7.
FIG. 9 is a plan view of another optical fiber splicer for use with welded splice elements having an array for releasably holding and fanning a plurality of optical fibers and splice elements.

As illustrated in FIGS. 1, 5, and 7, the welds 32 are located adjacent the longitudinal edges 24a and 24b opposite to the recess portions 26a and 26b. Also, the welds 32 are located substantially linearly with the pins 28a and 28b and the holes 30a and 30b. This adds to the structural integrity of the element 12 and facilitates its return to a closed position, as will be discussed hereinafter, after separation of the halves to accept the optical fibers 18 to be spliced.

The number and placement of the welds 32 can vary somewhat according to the needs dictated by a specific employment of the element 12. It has been determined that three welds 32 will give the desired performance. Thus, in a preferred construction, a weld 32 is located substantially at the intersection of an imaginary line defined by the pins 28a and 28b and the holes 30a and 30b with a latitudinal midline of the splice halves 14a and 14b. Additional welds 32 are located at or about the intersection of the above-noted imaginary line and the latitudinal edges 20a and 20b of the splice halves 14a and 14b.

Figure 4:
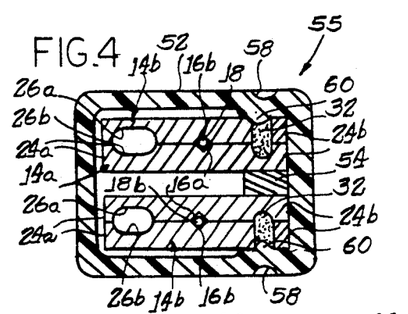
FIG. 4 is a sectional view, taken along line 4—4 of FIG. 3, illustrating another novel means for separating welded splice elements.
Figure 6:
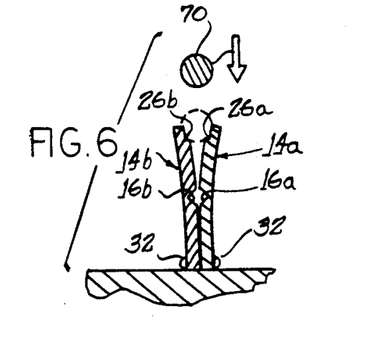
FIG. 6 is sectional view of the welded splice element portion of FIG. 5 showing a novel way for separating the same to allow for insertion of an optical fiber therein.

The structure of the welds 32 is shown most clearly in FIGS. 4 and 6. When the welds 32 are formed, material composing the splice halves 14a and 14b is melted. The molten material of both splice halves 14a and 14b commingles, thereby forming a firm joint between the halves 14a and 14b when the molten material has cooled and solidified.

With this welded construction, the splice halves 14a and 14b can be separated slightly momentarily to allow for insertion of the optical fibers 18, and will return towards their original unseparated or closed position, due to the resiliency and memory properties of the aluminum comprising the splice halves 14a and 14b. The splice element 12 is now complete and is ready for assembly with the splicer 10.

In this regard, the splicer 10 includes a body 35 of plastic or other suitably strong, protective, and insulating material, which is in turn provided with a slot 36 of dimensions sufficient to accept the element 12. Thus, the element 12 need only be slid into the slot 36 of the the splicer 10 to complete the same. The slot 36 extends along the interior of the body 35 a distance substantially equal to the longitudinal length of the element 12. However, means for separating the element may be provided so that the splice halves 14a and 14b can be separated to allow for insertion of the optical fibers 18.

Many different embodiments of the means for separating the element 16 can be utilized. One such embodiment is illustrated in FIGS. 1 and 2. In this embodiment, the splicer 10 further comprises a housing or ferrule 40 comprising a substantially tubular body 34. The body 34 also has a boss 38, shown in FIG. 2, projecting radially towards the interior of the body 34 a certain distance. The boss 38 preferably is disposed on the body 34 such that it aligns with the slot 36 and in particular with the recess portions 26a and 26b, and also extends along the interior of the body 34 a distance substantially equal to the major part of the length of the recess portions 26a and 26b on the element 12.

The shape and dimensions of the boss 38 complement the dimensions of the combined recess portions 26a and 26b, in such a manner that the boss 38 can be inserted into the combined recess portions 26a and 26b, as stated above, to cause the splice halves 14a and 14b to separate, allowing for insertion of optical fibers 18.

Specifically, the body 34 is composed of a deformable material having sufficient elastic and memory properties to allow it to be deformed and to return towards its original condition after deformation. In its original condition, the body 34 has a substantially circular latitudinal cross section with the boss 38 being located spaced away from the recess portions 26a and 26b when the element 12 is inserted into the slot 36.

When it is desired to briefly separate the splice halves 14a and 14b for fiber insertion or removal, a force (indicated by a phantom arrow in FIG. 2) is applied to the body 34 on the outer surface thereof directed over the boss 38. The force encourages the body 34 to deform, thereby shifting the boss 38 into the combined recess portions 26a and 26b. The force is transferred to the splice halves 14a and 14b so as to create force components substantially perpendicular to the direction of the combined fiber channels 16a and 16b, and in directions for pushing the halves 14a and 14b apart along edges 24 and 24b.

Because the splice halves 14a and 14b are held together by the welds 32 adjacent longitudinal edges 24a and 24b opposite to the combined recess portions 26a and 26b, the force causes the splice halves 14a and 14b to separate at an angle with respect to each other, with the welds 32 located adjacent the apex of the angle thus formed by the halves 14a and 14b.

By way of illustration, in a preferred construction, the halves 14a and 14b separate a linear distance of approximately 0.003 inches from their closed abutting position at the recess portions 26a and 26b, and a distance of approximately 0.001 inches at the fiber channel halves 16a and 16b. The distance of separation of the halves 14a and 14b thus decreases from a distance of approximately 0.003 inches at the recess portions 26a and 26b to 0 inches at the welds 32. The welds 32 are of sufficient strength to assure that the halves 14a and 14b will not separate proximate thereto. The distance of separation of the halves 14a and 14b at channel halves 16a and 16b is sufficient to allow for insertion of the optical fibers 18, 18b, and may vary slightly due to the structural tolerances of the halves 14a and 14b. Notably, the distance of separation is small enough and the structural integrity of the halves 14a and 14b, and of the welds 32 is great enough to insure that no permanent deformation of the element 12 will result, even with numerous repeated separations and closings. Thus, the invention provides a highly reliable, reusable splice construction for optical fibers, useful over many cycles of operation.

Once the halves 14a and 14b are sufficiently separated, the optical fibers 18, 18b can be inserted or removed as necessary or desired. If a fiber is inserted to effect a spliced connection with another fiber, fiber 18b is inserted into the combined fiber channels 16a and 16b until it encounter the fiber 18. In many applications, the fiber 18 is pre-inserted into the element 12 such that the end thereof is located adjacent a latitudinal midline of the element 12. In this manner, the spliced connection or interface 19 between the fibers is effected approximately midway along the fiber channels 16a and 16b.

Once a fiber has been inserted or removed, as desired, the force deforming the body 34 is removed, and the body 34 returns towards its original condition due to the elastic and memory properties thereof. As this occurs, the boss 38 shifts out of engagement with the combined recess portions 26a and 26b, allowing the element 12 to close. The resiliency and memory properties of the halves 14a and 14b and the strength of the welds 32 cause the element 12 to "spring back" toward its original closed position.

In the closed position, the distance of separation of the halves 14a and 14b is 0 inches along the entire length and width of the element 12 (i.e. the halves abut). Once the element has returned towards its closed position, the element 12 exerts a compression force on any fibers present, thereby holding them firmly in place within the channel halves 16a and 16b. The splice between the fibers is now effected.

As stated above, the unique construction of the element 12 allows it to be utilized with many different housings or splicers 10. In the splicer embodiment of FIGS. 1 and 2, the splicer 10 comprises the above-described ferrule 40 including the tubular body 34, and the body 35 including the slot 36 and the boss 38. The tubular body 34 has a relatively large diameter opening 42 on one end thereof, and a frusto-conical member 44 on the opposite end. The frusto-conical member 44 has a channel 46 therethrough of diameter sufficient to accept a buffer 48 on an optical fiber 18. The opening 42 is of diameter sufficient to accept a connector body 50.

In operation with this splicer 10, a buffered optical fiber 18 (buffer 48) is disposed through the connector body 50. The element 12 is inserted into the slot 36 as stated above, and the opening 42 of the ferrule 40 is slid over an end part of the connector 50. As the ferrule 40 is slid, the fiber 18 is aligned with the funnel portions 22a and 22b so that the fiber 18 is guided into the fiber channels 16a and 16b. Simultaneously, a force is applied to the body 34 in the above-described fashion, thereby opening the element 12 to receive fiber from connector body 50.

The element 12 is opened, and the fiber 18 is slid into the fiber channels 16a and 16b. Once the fiber 18 has been slid midway into the channels 16a and 16b, the opening 42 contacts and engages an end of the connector 50. If it is desired, an adhesive substance, such as an epoxy or a cyanoacrylate glue, can be provided on the end of the connector 50 so that when the opening 42 contacts it, an adhesive bond will be formed therebetween. The force is now removed, and the fiber 18 extending through the connector 50 is firmly held in the element 12.

Another buffered fiber 18b (buffer 48b) can be inserted into the channel 46 in the frusto-conical member 44 to effect a spliced connection with the first fiber 18. The fiber 18b slides through the channel 46 until it confronts a latitudinal edge 20a and 20b of the element 12. The force is reapplied to the body 34, again opening the element 12 sufficiently to accept the fiber 18b. The fiber 18b is guided into the fiber channels 16a and 16b by the funnel portions 22a and 22b towards the first fiber 18. The fiber 18b slides along the fiber channels 16a and 16b until it confronts and butts up against the first fiber 18 to form interface 19. The force is removed and the fibers 18 and 18b are firmly held in spliced connection within the element 12. Additional adhesive material can be provided proximate the channel 46 to hold the buffer 48 of the fiber 18 therein, thereby reducing strain on the spliced connection and the element 12.

As stated hereinabove, the unique construction of the element 12 allows it to be used with many different splicer constructions. Another splicer embodiment which can be utilized with the element 12 is illustrated in FIGS. 3 and 4. This type of splicer 55 is called a butt joint splice or a U-splice. Such a splicer is useful in applications where it is desired to make a splice connection from one side, such as the front surface of a panel or the like.

This splicer 55 comprises two splice elements 12 aligned and offset from each other vertically within a substantially rectangular housing 52. The elements 12 are placed one on top of the other and are separated by a substantially planarly rectangular spacer 54 engaging the elements 12 along facing surfaces thereof and extending substantially the entire length of the elements 12.

The elements 12 are connected by a thin U-shaped fiber 56 which extends from a midpoint of the fiber channels 26a and 26b of one element to the midpoint of the fiber channels 26a and 26b of the other element 12. Because the elements 12 are disposed one on another, the fiber 56 arcs between the elements 12, thereby forming the illustrated U-shape.

The housing 5 is of dimensions sufficient to accept and to protect the elements 12 and the U-shaped fiber 56. Means are also provided within the housing 52 for positively locating the elements 12 therein so that the fiber 56 will not be curved too sharply. This is important because the maximum permissible radius of curvature of optical fibers is limited (by the phenomenon of total internal reflection).

To perform this locating function while permitting flexing of the elements 12 between the closed and open positions, portions of the housing 52 are deformed to create a pair of dimples 58 at opposite exterior surfaces of thereof. The dimples 58 cause corresponding projections 60 to extend into the interior of the housing 52. The dimples 58, and thus the projections 60, are preferably substantially linear, extending along both sides of the housing 52 a length substantially equal to the length of the elements 12. The dimples 58 are located on the housing 52 such that they align with the imaginary line formed by the pins 28a and 28b, the holes 30a and 30b, and the welds 32 on both of the halves 14a and 14b, as shown in FIG. 4.

The spacer 54 is relatively strong and incompressible, and is located between the elements 12 is alignment with the imaginary line and the dimples 58 and projections 60. Accordingly, the elements 12, the spacer 54, and the dimple-bearing surfaces of the housing 52 define substantially parallel planes vertically offset from one another as viewed in FIG. 4. Thus, the spacer 54 and the dimples 58, do not interfere with the halves 14a and 14b of elements 12 when an appropriate tool is used to apply a force at recesses 26a and 26b causing them to separate in the above-discussed manner to allow for these recesses 26a and 26b in the embodiment of FIGS. 3 and 4 are similar to those described in the above-referenced '127 application, and as such a tool similar to the one described in the '127 application may be used to separate the halves 14a and 14b of FIGS. 3 and 4.

By way of example, in practice, the elements 12, are aligned separated by the spacer 54. The tool may then be applied to the recesses 26a and 26b, and each element 12 is separated a distance substantially equal to the above-discussed distances. One end of the fiber 56 is inserted into an adjacent end of each of the elements 12. Once the fiber 56 has been fully inserted midway into the fiber channels 16a and 16b of both elements 12, the tool (force) is removed, and the elements 12 clampingly retain the fiber 56 therein. At this point, the assembly thus formed can be inserted into the housing 52, and dimples 58 can be formed to retain it therein.

The assembly can now be used in a front-facing splicing arrangement. Fibers 18, 18b can be inserted into the elements 12 in the following manner. The tool is used to apply the necessary force to the recesses 26a and 26b, causing the element 12 to flex open. One fiber 18, 18b is inserted into each of the fiber channels 16a and 16b of elements 12 as discussed above. Once each fiber 18, 18b is properly located within the fiber channels 16a and 16b of one of elements 12, the force is removed and the element 12 clampingly retains the fiber 18 and one end of the fiber 56 therewithin in spliced connection at interfaces 19. Accordingly, one fiber 18 may be connected to another fiber 18b through interfaces 19 with the fiber 56, with the connection being made from one side.

Yet another splicer embodiment that can be used with the element 12 is illustrated in FIG. 5. In this embodiment, the splicer 65 comprises two substantially identical, slidably interconnectable boots 62. Each of the boots 62 comprises a substantially cylindrical body portion 64 connected to a frusto-conical portion 66. The body portion 64 is of dimensions sufficient to accept the element 12, and the frusto-conical portion 66 has a channel 68 therein to accept the buffer 48 or 48b on an optical fiber 18, 18b. The boots 62 can be substantially identically constructed, however, mating interlocking means, such as tabs and notches, may be provided thereon.

In an illustrative application, the boots 62 are applied to the fibers 18, 18b to be spliced together. Specifically, the fibers 18 are inserted into the channels 68 of the boots 62. The boots 62 are pushed along the fibers 18, 18b a distance sufficient to allow space for the subsequent construction.

The fibers 18, 18b are now inserted into the element 12. The element 12 may be constructed as described above, with recesses 26a and 26b of the form shown in either FIG. 2 or FIG. 4. However, a somewhat different arrangement of recesses 26a and 26b and form of tool is shown in FIG. 6. More specifically, a rod 70 is placed on the recess portions 26a and 26b. The longitudinal edge 24a and 24b of the element 12 adjacent the welds 32 is either placed on a hard surface, or is placed in the hand of a workman. If placed on a hard surface, a force is applied to the rod 70, forcing it into the recess portions 26a and 26b; if in a workman's hand, the workman can apply a similar force to the element 12 and the rod 70 by compressing the element 12 with the rod 70 by appropriate manipulation of his thumb and forefinger.

By either method, the halves 14a and 14b are forced to flex and separate in the above discussed manner as is illustrated in FIG. 6. The fibers 18 are now inserted into the fiber channels 16a and 16b until they contact and confront each other substantially at the midpoint of the channels 16a and 16b. The force is removed and the element 12 clampingly holds the fibers 18 therewithin in spliced connection.

With the fibers 18, 18b firmly held within the element 12, the boots 62 can be joined to protect the element 12. The boots 62 are slid along the buffers 48 of the fibers 18 until they contact and engage each other. The boots 62 are joined preferably such that their junction is substantially in alignment with the latitudinal midline of the element 12. To further insure a firm connection between the boots 62, an adhesive material, disclosed above, can be added to an end of the channels 68 so as to form an adhesive bond between the boots 62 and the buffers 48 on the fibers 18, 18b. Additionally, if locking means are not provided, adhesive material can be provided at the juncture of the bodies 64 of the boots 62.

Still another embodiment of the splicer useful with the element 12 is illustrated in FIGS. 7 and 8. This splicer 75 is similar to the splicer 10 shown in FIGS. 1 and 2, and comprises an elongated body 72, a sleeve 74 for covering the body 72, and a nut 76a or 76b for firmly releasably connecting the sleeve 74 and a mating adapter (not shown in FIG. 7) to the body 72. The nut 76a is of the ST-type, while the nut 76b is of the SC-type. Both nuts 76a and 76b are spring-biased, and accordingly have associated springs 78a and 78b. This splicer 75 could be modified for use with other adapter systems without departing from the invention.

The body 72 is substantially cylindrical and tubular in configuration, and has an axial bore 80 for accepting the element 12 and fibers 18, 18b. A longitudinal slit 82 is provided to receive the element 12 and is aligned with the bore 80. Preferably, the slit 82 extends from a distal end of the body 72 towards the opposite end a distance substantially equal to the length of the element 12.

The sleeve 74 has a substantially cylindrical elongated body 84 having an internal diameter sufficient to accept the body 72 therein. A frusto-conical section 86 is disposed on an end of the body 84 opposite to the end thereof which slides over the body 72. The frusto-conical section 86 is substantially similar in construction to the frusto-conical portion 66 of FIG. 5, having a through central bore 87. However, an additional opening 85 is provided to permit entry of a suitable tool for engaging recesses 26a and 26b of splice element 12 to permit insertion or removal of a fiber. Opening 85 is offset from through central bore 87.

This embodiment of the splicer 75 is employed as follows. A buffered fiber 18 is pressed through the bore 80 in the body 72. The frusto-conical section 86 of the sleeve 74 is slid over the buffer 48 of another fiber 18 sufficiently to allow enough slack fiber 18 for subsequent operations.

The fiber 18 is inserted into one side of the element 12 in the above disclosed fashion by use of a suitable tool. The element 12 is then slid into the slit 82 in the body 72. The sleeve 74 is placed over the body 72, thereby covering the slit 82. A nut, either 76a or 76b, depending upon requirements or specifications, is then slid over the sleeve 74 and is locked in engagement with the body 72. The nut 76a or 76b thereby releasably joins the body 72 and the sleeve 74 with a matching adapter to complete this embodiment of the splicer 75. A SC-type adapter 79 is shown coupled to the body 72 by the SC nut 76b in FIG. 8. A cooperating dog 83 and flange 77 secure the nut 76b to the adapter 79, which has ears 89 to initially receive the dog 83.

Advantageously, the same splicer 75 can be used interchangeably with either SC- or ST-type adapters by the selection of the appropriate nut 76a or 76b.

Because the element 12 can be utilized with a plurality of different splicer constructions, other devices can also be employed in the splicer, such as arraying or fanning devices. One such device is an array 88 for holding multiple elements 12 and buffers 48 on a plurality of optical fibers 18 which is illustrated in FIGS. 9 through 12. The array 88 has particular utility with optical fiber telecommunications networks wherein a large number of pairs of optical fibers 18 are connected by means of an equal number of elements 12.

The array 88 is composed preferably of an elastically resilient material, such as a plastic and the like, and comprises a longitudinally extending substantially planar base 90 of a pre-determined shape and configuration. A plurality of longitudinally extending ribs 92 project substantially perpendicularly upwards from the base 90 along one side thereof. Therefore, in a preferred construction, one side of the base 90 is substantially smooth and planar, while the opposite side bears the ribs 92.

Figure 11:
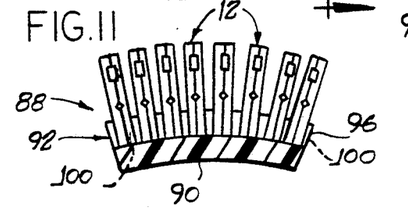
FIG. 11 is a partially sectioned end elevational view, taken along line 11—11 of FIG. 10, showing the deformation of the array when a plurality of splice elements are held thereby.

The ribs 92 are arranged in a longitudinally extending substantially parallel manner in at least three groups: a first buffer group 94, an element group 96, and a second buffer group 98. The element group 96 is located on the base 90 between the first and second buffer groups 94 and 98. As shown in FIGS. 9 and 11, the ribs 92 are arranged such that spaces or cavities 100 are located between adjacently parallel ribs 92. The configuration of the cavities 100 depends upon the particular rib group.

Specifically, the cavities 100 in the buffer groups 94 and 98 are configured and are of dimensions sufficient to accept and to retain a buffer 48 on an individual optical fiber 18, while the cavities 100 in the element group 96 are configured and are of dimensions sufficient to accept and to retain an element 12 along a longitudinal edge 24a and 24b thereof. The buffers 48 and the elements 12 can be positioned within the cavities 100 by the application of an appropriate force, thereby pressing those components into the proper cavities 100. The elastic and resilient properties of the material comprising the array 88 assures that the elements 12 and the buffers 48 are held firmly within the cavities 100.

Figure 10:
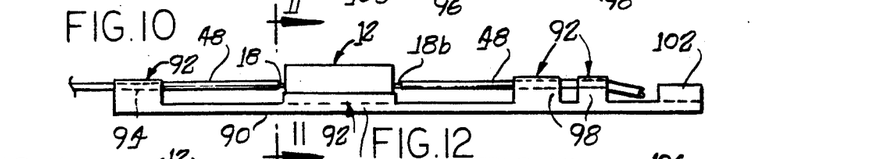
FIG. 10 is side elevational view of the structure of FIG. 9.

Thus, as illustrated in FIG. 10, an element 12 can be releasably retained within a cavity 100 in the element group 96, and optical fibers 18 to be spliced together can be releasably retained by placing their respective buffers 48 within cavities 100 in the first and second buffer groups 94 and 98. In practice, for example, a fiber 18 is connected to the telecommunications equipment and is held within the first buffer group 94, while an incoming fiber 18b is held within the second buffer group 98. To further facilitate ordered arrangement of the fibers 18 and their fanning from a cable, a cable jacket clamp 102 for releasably retaining a cable jacket, not shown for clarity, is provided such that the second buffer group 98 is located between the element group 96 and the jacket clamp 102.

The array 88 is capable of holding a plurality of elements 12, and buffers 48 of a plurality of optical fibers 18, as shown in FIG. 11. While the array 88 is shown in the Figures as holding only eight elements 12 and double that number of buffers 48, it is to be noted that the invention contemplates array 88 constructions capable of holding different numbers of such components.

Figure 12:
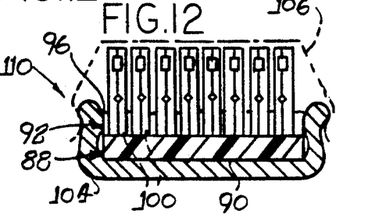
FIG. 12 is a view similar to that of FIG. 11, showing the deformation of the array corrected by the application of a clip.

As shown in FIG. 11, due to the resiliency and elasticity of the array 88, the base 90 deforms when the cavities 100 are occupied by elements 12 and buffers 48. The base 90 deforms from its substantially linearly planar configuration into a substantially arcuate configuration. To return the array 88 towards its originally planar configuration, and to assure that the elements 12 and the buffers 48 are held firmly within the cavities 100, a clip 104 is provided which, upon application to the array 88 forces it to return to its original configuration, as shown in FIG. 12.

Either before of after the clip 104 has been properly installed on the array 88, the base 90 is forced back into a substantially planar configuration. This also causes the ribs 92 to further compress against the exterior surfaces of the elements 12 and the buffers 48 therewithin, thereby further insuring that those components are held firmly within the cavities 100. The array 88 is thusly able to maintain a particular neat and orderly fashion.

Once the elements 12 are properly located within the cavities 100, the optical fibers 18 can be spliced together in the above-discussed fashion. However, in his case, a substantially L-shaped tool of the type discussed in the above-referenced '127 application, not shown for clarity, is provided for entering recesses 26a and 26b for separating the halves 14a and 14b. The particular shape of the tool assures that the actuation thereof will not interfere with fiber 18 insertion. This insertion can take place either before or after application of the clip 104. If desired, the array 88 can be provided with a cover 106, shown in phantom in FIG. 12, so that the array 88 itself can comprise a splicer 110. The use of the element 12 allows the splicer 110 to be relatively compact as compared with other, prior art splicers.

While a particular embodiment of the present invention has been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An optical fiber splicer useful for effecting a splice connection between at least two optical fibers comprising: a splice element comprising a pair of joinable splice halves, means on the splice halves for defining a fiber channel for accepting an optical fiber when the splice halves are joined and aligned, said channel extending through the splice element, means on the splice halves for defining a recess portion to one side of the fiber channel when the splice halves are joined and aligned, said recess portion being configured for receiving means for applying a force for separating the halves to allow for one of fiber insertion and removal relative to the fiber channel, weld means for joining the halves disposed to a side of the fiber channel opposite to the recess portion, and the weld means holding the halves together along a side adjacent thereto for grippingly engaging a pair of optical fibers introduced to respective opposite ends of said fiber channel for splicing said pair of optical fibers, while allowing the halves to separate along a side adjacent the recess portion so that the halves are at an angle to each other in response to application of a predetermined separating force to the recess portion for allowing one of insertion and removal of a fiber with respect to said fiber channel, with the weld means being generally adjacent an apex of an angle so formed by the halves and the weld means positively encouraging the halves back together for grippingly engaging said pair of optical fibres in said fiber channel when the application of said predetermined separating force has ceased.

2. An optical fiber splicer as defined in claim 1, said splice element further comprising an alignment pin and a complementary constructed and located hole disposed on each splice half, and the pin on each half being insertable into the hole on the other half when the halves are joined for aligning the halves to define the fiber channel and the recess portion.

3. An optical fiber splicer as defined in claim 2 wherein the element has a pair of latitudinal edges and a pair of longitudinal edges, the recess portion being disposed adjacent one of the longitudinal edges, and the weld means, the pins and the holes being disposed adjacent the opposite longitudinal edge.

4. An optical fiber splicer as defined in claim 3 wherein the weld means comprises a plurality of welds, and the pins and the holes define a line substantially parallel to the longitudinal edges, the welds being disposed substantially along the line, two welds being located near intersections of the line with the latitudinal edges, and another weld being located near an intersection of the line with a latitudinal midline of the element.

5. An optical fiber splicer as defined in claim 4 wherein the halves each have a thickness and the element has a thickness equal to the combined thicknesses of the halves, the two welds extending across the thickness of the element, and the another weld extending across one half through its entire thickness and terminating at a point substantially midway of the thickness of the other half.

6. An optical fiber splicer as defined in claim 1 wherein the weld means are formed by a carbon dioxide laser.

7. An optical fiber splicer as defined in claim 1 wherein, when said predetermined separating force is applied, the halves are separated by a distance of approximately 0.003 inches proximate to the recess portion, are separated a distance of approximately 0.001 inches proximate to the fiber channel, and are in close contact proximate to the welds.

8. An optical fiber splicer as defined in claim 1 wherein the recess portion is of dimensions sufficient to accept a rod dimensioned for applying a force to the recess portion for separating the halves.

9. An optical fiber splicer according to claim 1, and further including a housing comprising a tubular body composed of a deformable material having an opening of dimensions sufficient to accept the splice element, a slot disposed on the interior of the tubular body for accepting and retaining the splice element therewithin, a boss disposed on the interior of the tubular body on a side thereof opposite to the slot, and the tubular body being deformable upon application of an appropriate force thereto for shifting the boss into the recess portion, the boss being sized relative to the recess portion for applying said predetermined separating force for separating the splice halves to allow for one of fiber insertion and removal when the boss ins shifted into the recess portion.

10. An optical fiber splicer as defined in claim 9 wherein the boss is of a shape which complements a corresponding shape of the recess portion for facilitating insertion of the boss into the recess portion and for facilitating force transfer from the boss to the recess portion.

11. An optical fiber splicer according to claim 1, and further including a housing comprising a pair of interconnectable boots, the boots being of dimensions sufficient to house the splice element when interconnected, and the boots each having a substantially frusto-conical portion with an opening therein for accepting an optical fiber.

12. An optical fiber splicer according to claim 1, and further including a housing comprising a body and a sleeve, the body having a slot therein to accept the splice element, the sleeve being of dimensions sufficient to accept and to house the body with the splice element accepted in the slot, and an adapter-receiving nut releasably connected to the body.

13. An optical fiber splicer as defined in claim 12 wherein the adapter is spring biased.

14. An optical fiber splicer as defined in claim 12 wherein the adapter-receiving nut is, interchangeably, one of an ST-type and an SC-type.

15. An optical fiber splicer as defined in claim 12 wherein the body has an axial bore therein of dimensions sufficient to accept an optical fiber.

16. A splice element as defined in claim 1 wherein the splice halves are substantially identical.

17. An array for arranging and fanning a plurality of splice elements comprising elongate generally rectilinear members having opposite longitudinal ends and two pairs of parallel latitudinal sides and optical fibers spliced together by and projecting outwardly of longitudinal ends of said splice elements, said array comprising: an elongate base formed of an elastically resilient material; a plurality of elastically resilient ribs longitudinally extending and projecting from the base and spaced apart by a distance substantially equal to a dimension of said splice elements across one of said pairs of latitudinal sides for accepting and firmly retaining the splice elements therebetween.

18. An array as defined in claim 17 and further including a plurality of ribs arranged in at least a first buffer group, and a second buffer group with the ribs for retaining the splice elements being located between the first and second buffer groups.

19. An array as defined in claim 18 wherein the ribs of the buffer groups define cavities of dimensions sufficient for accepting and retaining buffers on optical fibers.

20. An array as defined in claim 17 further comprising a jacket clamp of dimensions sufficient for accepting and firmly retaining a jacket on an optical fiber cable comprising a plurality of bundled optical fibers; and the jacket clamp disposed on an end part of the array.

21. An array as defined in claim 17 further comprising a clip appliable to the base for applying forces to said base and said ribs for insuring that the splice elements are firmly retained between the ribs and for overcoming forces applied to said ribs by said splice elements, which forces tend to deform said base into a generally accurate configuration and thereby securely holding said base in a substantially planar condition.

22. An optical fiber splice element for effecting a splice connection between at least two optical fibers comprising: a pair of joinable splice halves; means on the splice halves defining a fiber channel extending through the element when the splice halves are joined and aligned for accepting an optical fiber; and weld means for joining and aligning the halves disposed thereon for holding the halves together to one side of the fiber channel and for grippingly engaging a pair of optical fibers introduced to respective opposite ends of said fiber channel to effect splicing of said pair of optical fibers, while allowing the halves to separate upon application of a predetermined separating force at a side of said fiber channel opposite said one side to allow for one of fiber insertion and removal, so that the halves are at an angle to each other when separated by application of a predetermined separating force thereto with the weld means being adjacent an apex of an angle so formed by the halves, and the weld means positively encouraging the halves back together when the application of the predetermined separating force has ceased for grippingly engaging said pair of optical fibers in said fiber channel.

23. A splice element as defined in claim 22 wherein the splice halves are substantially identical.

24. A splicer comprising: a pair of splice elements comprising elongate generally rectilinear members having opposite longitudinal ends and two pairs of parallel latitudinal sides and a spacer located between one of the latitudinal sides each of said splice elements; a housing of dimensions sufficient to contain the two splice elements and spacer; the splice elements being stacked longitudinally in parallel to each other, and separated by the spacer; and the spacer extending between the elements; a substantially U-shaped optical fiber having one end coupled with one longitudinal end of each of the splice elements thereby optically joining the splice elements together for optically joining a pair of fibers coupled to opposite longitudinal ends of the two splice elements; and the housing also accommodating the U-shaped optical fiber; the housing having a closed longitudinal end for completely surrounding said U-shaped optical fiber and an opposite, open longitudinal end for access to said opposite longitudinal ends of the two splice elements to permit insertion and removal of optical fibers relative thereto, said splicer thereby permitting the optical joining of two optical fibers from one longitudinal end of said splicer.

* * * * *

UNITED STATES PATENT AND TRADEMARK OFFICE
CERTIFICATE OF CORRECTION

PATENT NO. : 5,216,736
DATED : Jun 1, 1993
INVENTOR(S) : Robert Essert

It is certified that error appears in the above-indentified patent and that said Letters Patent is hereby corrected as shown below:

Column 6, Lines 64 and 65 "24 and 24b" should be
--24a and 24b--

Column 8, Lines 10 "fiber from" should be
--fiber 18 from--

Column 9, Lines 28 and 29 "for these" should be
--for fiber 18 insertion or removal. It will be noted
  that these --

Column 12, Line 48 "particular neat" should be
--particular arrangement of optical fibers 18 and
  elements 12 in a neat and orderly fashion. --

Signed and Sealed this

Twenty-ninth Day of March, 1994

Attest:

BRUCE LEHMAN

Attesting Officer    Commissioner of Patents and Trademarks